United States Patent
Dani et al.

(10) Patent No.: US 9,796,481 B2
(45) Date of Patent: Oct. 24, 2017

(54) METHOD AND SYSTEM ABOARD AN AIRCRAFT FOR GENERATING AN ANOMALY REPORT

(71) Applicant: AIRBUS OPERATIONS (S.A.S.), Toulouse (FR)

(72) Inventors: Mohamed-Cherif Dani, Toulouse (FR); Cassiano Silveira Freixo, Toulouse (FR)

(73) Assignee: Airbus Operations (S.A.S), Toulouse (FR)

(*) Notice: Subject to any disclaimer, the term of this patent is extended or adjusted under 35 U.S.C. 154(b) by 115 days.

(21) Appl. No.: 14/886,743

(22) Filed: Oct. 19, 2015

(65) Prior Publication Data
US 2016/0107765 A1    Apr. 21, 2016

(30) Foreign Application Priority Data
Oct. 20, 2014   (FR) ..................... 14 60070

(51) Int. Cl.
*B64D 45/00*    (2006.01)
*G06N 99/00*    (2010.01)
(Continued)

(52) U.S. Cl.
CPC ......... *B64D 45/00* (2013.01); *G05B 23/0251* (2013.01); *G06N 99/005* (2013.01);
(Continued)

(58) Field of Classification Search
CPC ............ B64D 45/00; B64D 2045/0065; B64D 2045/0085; B64D 2045/009;
(Continued)

(56) References Cited

U.S. PATENT DOCUMENTS

| | | | | |
|---|---|---|---|---|
| 6,024,324 A | * | 2/2000 | Maino | G01H 1/003 180/337 |
| 6,408,259 B1 | * | 6/2002 | Goebel | B64D 43/00 701/100 |

(Continued)

FOREIGN PATENT DOCUMENTS

EP    1 455 313 A1    9/2004

OTHER PUBLICATIONS

French Search Report for Application No. 1460070 dated May 8, 2015.

*Primary Examiner* — Thomas G Black
*Assistant Examiner* — Sara Lewandroski
(74) *Attorney, Agent, or Firm* — Jenkins, Wilson, Taylor & Hunt, P.A.

(57) ABSTRACT

A method and system for generating an alert report on board an aircraft, comprising an on-board acquiring module configured to acquire data relating to the aircraft, the data originating from sensors and/or equipment installed in the aircraft. An on-board processing module is configured to detect possible anomalies by automatically partitioning the data into a set of homogeneous groups, each anomaly being revealed by a corresponding datum belonging to no homogeneous group. An on-board alert-emitting module is configured to emit an alert report on each detection of an anomaly. An on-board transmitting module is configured to transmit the alert report to the ground and in real-time.

6 Claims, 3 Drawing Sheets

(51) Int. Cl.
*G05B 23/02* (2006.01)
*G07C 5/00* (2006.01)
*G07C 5/08* (2006.01)

(52) U.S. Cl.
CPC ........... *G07C 5/008* (2013.01); *G07C 5/0808* (2013.01); *G07C 5/0816* (2013.01); *B64D 2045/0065* (2013.01); *B64D 2045/0085* (2013.01); *G07C 5/0841* (2013.01)

(58) Field of Classification Search
CPC .... B64D 2045/008; B64D 2700/62289; G05B 23/0251; G05B 23/0254; G05B 23/0243; G05B 23/0218; G05B 23/02; G06N 99/005; G07C 5/008; G07C 5/0808; G07C 5/0816; G07C 5/0841
See application file for complete search history.

(56) References Cited

U.S. PATENT DOCUMENTS

| | | | | | |
|---|---|---|---|---|---|
| 7,702,435 | B2* | 4/2010 | Pereira | ................ | G05B 13/042 701/30.8 |
| 8,255,100 | B2 | 8/2012 | Schimert | | |
| 8,271,233 | B2* | 9/2012 | Butler | ................ | F01D 21/003 702/185 |
| 2004/0176887 | A1* | 9/2004 | Kent | ................ | G07C 5/008 701/29.5 |
| 2008/0091630 | A1* | 4/2008 | Bonissone | ........... | G05B 23/024 706/45 |
| 2009/0216393 | A1* | 8/2009 | Schimert | ........... | G05B 23/0251 701/14 |
| 2011/0087387 | A1* | 4/2011 | Safa-Bakhsh | .......... | G07C 5/006 701/16 |
| 2011/0150626 | A1* | 6/2011 | Kinzie | ................ | G01H 1/003 415/1 |
| 2014/0149806 | A1* | 5/2014 | Khalastchi | ......... | G06K 9/00496 714/49 |
| 2015/0019070 | A1* | 1/2015 | Chrysanthos | ...... | G05B 23/0227 701/33.4 |
| 2015/0040650 | A1* | 2/2015 | Lacaille | ................ | G01M 15/14 73/112.01 |
| 2015/0088363 | A1* | 3/2015 | Besseau | ................ | B64D 45/00 701/29.6 |
| 2015/0134198 | A1* | 5/2015 | Masse | ................ | G05B 23/0235 701/34.2 |
| 2015/0321768 | A1* | 11/2015 | Kumar | ................ | B64D 45/00 340/870.07 |
| 2015/0324501 | A1* | 11/2015 | Desell | ................ | G01C 23/00 703/2 |

* cited by examiner

METHOD AND SYSTEM ABOARD AN AIRCRAFT FOR GENERATING AN ANOMALY REPORT

CROSS-REFERENCE TO RELATED APPLICATION

This application claims priority to French Patent Application FR 14 60070 filed Oct. 20, 2014, the entire disclosure of which is incorporated by reference herein.

TECHNICAL FIELD

The present disclosure relates to the field of anomaly detection in an aircraft. In particular, the disclosure herein relates to a method and system for generating an alert report on each anomaly detection on board the aircraft.

BACKGROUND

An aircraft is in general equipped with a monitoring system intended to analyze a plurality of parameters in order to monitor the correct operation of the various pieces of equipment of the aircraft. This system is composed of a machine for recording and monitoring the state of the aircraft called the aircraft condition monitoring system (ACMS). The ACMS is configured to acquire and store data originating from sensors and/or other equipment of the aircraft during each flight in order to monitor the performance of the various systems of the aircraft and detect malfunctions or anomalies.

More particularly, the ACMS is programmed to trigger an alert report when an anomaly is detected. Each report is transmitted by the aircraft in flight to a station on the ground in real-time via a data transmitting system called the aircraft communications addressing and reporting system (AGARS). The report consists of a snapshot of a state of the aircraft of a few seconds in length recorded around the detection of an anomaly. Of course, the stored data are very large in volume and it is not currently possible to transmit all these data from an aircraft in flight. In contrast, at the end of the flight, all the recorded data may be extracted from the ACMS via a special piece of equipment in order to carry out more detailed analyses if necessary.

This device is very effective but has a few drawbacks. In particular, each alert report is triggered based on criteria that are pre-set depending on a priori knowledge of the various avionic systems, and therefore do not cover all system conditions or all possible malfunctions. Specifically, the alert trigger is programmed depending on known properties of various parameters associated for example with their physical constraints and/or logic, thresholds, links with anomaly indicators, etc. It is thus probable that new anomalies that are unexpected or not preset will not be detected by the system. Thus, the implementation of these conditions and constraints in the ACMS enables only partial supervision of the avionic systems.

Furthermore, the data contained in the report transmitted to the ground may not be sufficient to analyze the anomaly detected on board the aircraft. Specifically, only the data contained in the reports transmitted by the aircraft are exploitable in real-time. The data saved by the ACMS between two successive triggers are exploitable only after the aircraft has landed. In addition, it is necessary to have access to the aircraft to collect these data.

The present disclosure provides a system and method for generating and transmitting alert reports from the aircraft without the aforementioned drawbacks, in particular by implementing autonomous on-board data processing allowing in real time a precise and complete report taking into account all the relevant data to be generated.

SUMMARY

The present disclosure provides an autonomous on-board system and method for processing data and for generating and transmitting complete alert reports, the system comprising the following modules:

an on-board acquiring module configured to acquire data relating to the aircraft, the data originating from sensors and/or equipment installed in the aircraft;

an on-board processing module configured to detect possible anomalies by automatically partitioning the data into a set of homogeneous groups, each anomaly being revealed by a corresponding datum belonging to no homogeneous group;

an on-board alert-emitting module configured to emit an alert report on each detection of an anomaly; and an on-board transmitting module configured to transmit the alert report to the ground and in real-time.

This system is autonomous and suitable for processing all the data acquired on board the aircraft, allowing complete and precise reports to be delivered while avoiding downloading all the data each time the aircraft lands.

BRIEF DESCRIPTION OF THE DRAWINGS

Other particularities and advantages of the device and method according to the disclosure herein will become more clearly apparent on reading the description given below, by way of non-limiting indication, with reference to the appended drawings, in which.

DETAILED DESCRIPTION

A principle of the disclosure herein relates to automatically and adaptively partitioning the data available on board an aircraft in order to detect anomalies and generate complete reports on these anomalies.

Figure 1:
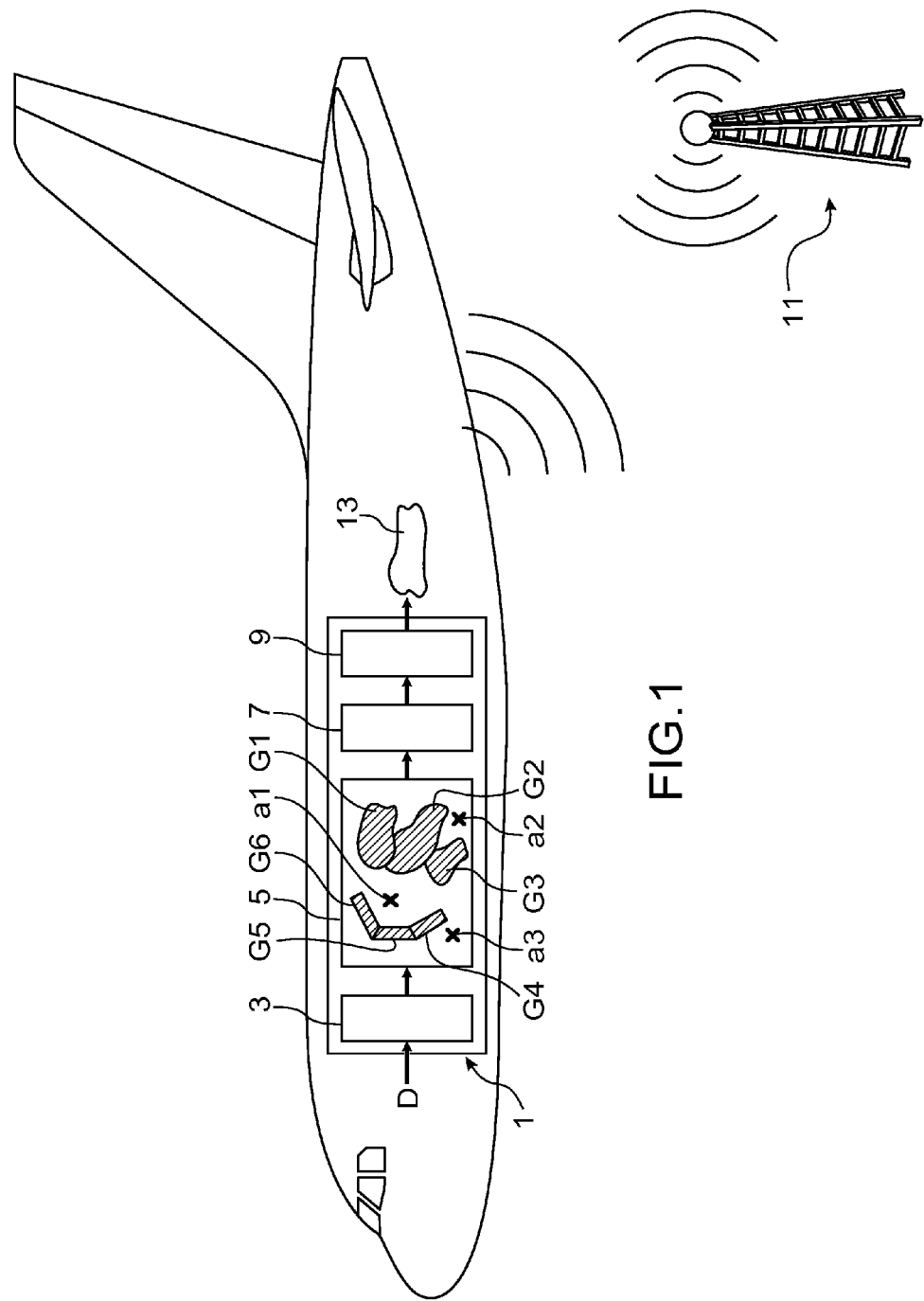
FIG. 1 schematically illustrates a system for generating alert reports, according to one embodiment of the disclosure herein.

FIG. 1 schematically illustrates a system for generating alert reports, according to one embodiment of the disclosure herein.

The generating system comprises an analyzing device 1 installed on board an aircraft comprising an acquiring module 3, a processing module 5, an alert-emitting module 7, and a transmitting module 9.

The on-board acquiring module 3 is configured to acquire data D relating to the aircraft. These data D consist of or comprise a plurality of time series of measurements or signals originating from sensors and/or equipment installed in the aircraft and are representative of avionic parameters associated with the various systems of the aircraft.

Specifically, vibration sensors, velocity sensors, temperature sensors, pressure sensors, etc. are integrated into the aircraft in order to collect over time measurements of parameters relating to the aircraft and its environment. Furthermore, equipment such as recording, regulating or controlling machines generate data on avionic parameters during the flight of the aircraft. More particularly, the data D relating to the aircraft collected by the acquiring module 3 originate from the aircraft condition monitoring system (ACMS).

The on-board processing module 5 is configured to detect possible anomalies by partitioning the data D into homogeneous groups G1-G6. The partitioning may be carried out using a data-driven technique or a data-mining technique based on a distance measurement, a density measurement, or on a hierarchical classification of the various data, so that the data are assembled into homogeneous groups depending on their characteristics. Each group contains a number of data higher than a preset threshold and the distance between the various points of a given group is smaller than a radius that is possibly set automatically. The data that belongs to any one of the homogeneous groups form a data class labeled "normal data". In contrast, the data a1-a3 that belong to none of these homogeneous groups G1-G6 form a class of suspect data that will possibly be labeled to a first approximation as "abnormal data". More particularly, a suspect datum may be due to an anomaly and therefore labeled as an abnormal datum a1-a3 or quite simply due to a new condition signaling a new group of data that will subsequently be confirmed by new data. Thus, to a first approximation, each detection of an anomaly is revealed by a corresponding datum a1-a3 (labeled as an abnormal datum) belonging to no homogeneous group G1-G6.

According to a first embodiment, the data may be partitioned using an unsupervised learning method (i.e. without any prior knowledge of the data). Specifically, this unsupervised learning method is configured to discover by itself the various homogeneous structures of the data D.

Advantageously, in order to decrease the amount of data to be processed on board the aircraft, the data D acquired by the acquiring module 3 are buffered and smoothed (for example using a segmentation or filtering technique) before they are processed by the processing module 5. The smoothing allows the volume of data to be decreased without losing relevant information.

Figure 2:
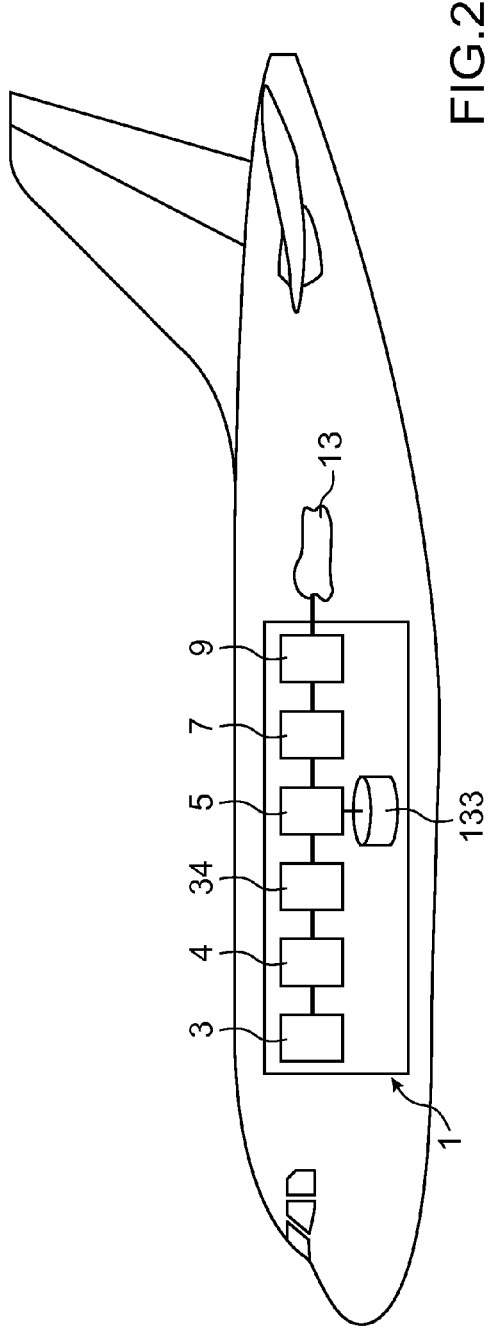
FIG. 2 schematically illustrates a system and also a method for generating alert reports, according to a preferred embodiment of the disclosure herein.
Figure 2:
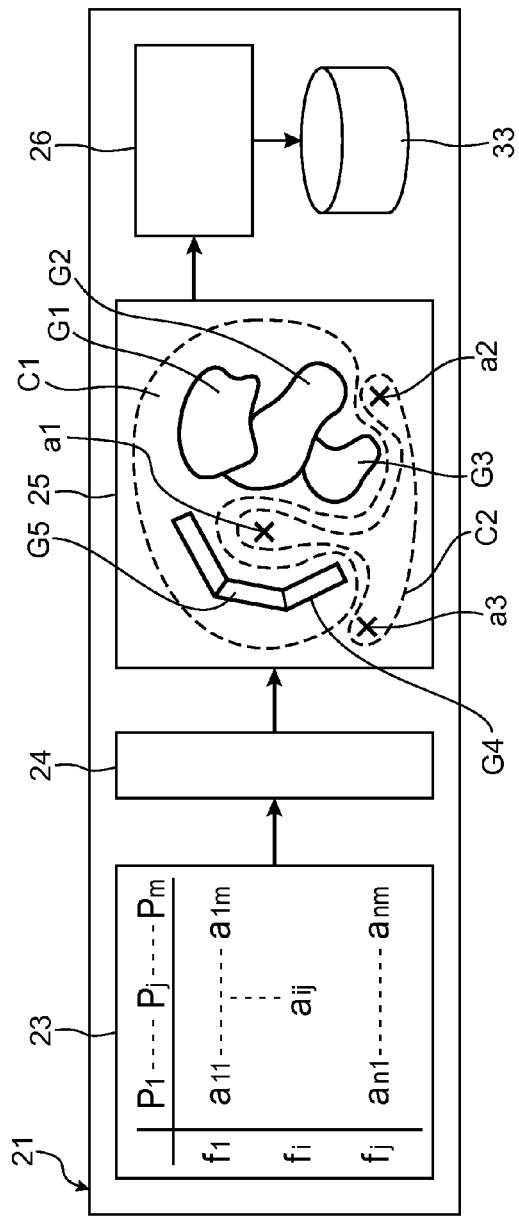

According to a second embodiment, the data may be partitioned by the processing module 5 using a semi-supervised learning technique by comparing the actual data D (not yet labeled) collected on board the aircraft to abnormal learning data (i.e. preliminary data already labeled as abnormal) recorded in a knowledge database (see FIG. 2).

Specifically, learning data relating to a fleet of aircraft may be downloaded on the ground after aircraft landing. For example, after a set number of flights of each aircraft belonging to the fleet, the data collected on board the aircraft are extracted so that they can be analyzed on the ground. These preliminary data may originate from at least one data source from a plurality of sources associated with the set of aircraft and possibly comprise the following sources: sensors installed in each aircraft, the ACMS of each aircraft, electronic logbooks, maintenance reports, manual requests via a human-machine interface (for example in the cockpit), etc.

A ground-based analyzing device (see FIG. 2) may be used to automatically partition all the learning data using an unsupervised learning technique generating a class of normal learning data and another class of abnormal learning data. The abnormal learning data are confirmed by experts and stored in a first knowledge database that will then be installed on board the aircraft.

As a variant, the data may be partitioned using a semi-supervised learning technique by comparing the data collected on board the aircraft to normal learning data recorded in a second knowledge database. In this case, the normal preliminary data processed by the processing unit are stored in this second knowledge database.

Advantageously, the data are partitioned dynamically and in a way that evolves. Specifically, the first and/or second knowledge databases are updated after each extraction on the ground of data relating to the set of aircraft.

Moreover, on each detection of an anomaly on board the aircraft, the on-board alert-emitting module 7 is configured to emit an alert report consisting of a snapshot or a time window of data recorded during the few short seconds before and after the detection of the anomaly.

The on-board transmitting module 9 is configured to transmit the alert report to a station 11 on the ground in real-time via the AGARS network 13. Advantageously, the alert report is compressed before its transmission to the ground.

Thus, the present disclosure provides an autonomous system that processes all the data and that delivers complete and precise reports while avoiding downloading all the data on each landing.

FIG. 2 schematically illustrates a system and also a method for generating alert reports, according to a preferred embodiment of the disclosure herein.

The generating system comprises an analyzing device 21 installed in a ground station and another analyzing device 1 on board.

The analyzing device 21 on the ground comprises an acquiring unit 23, a smoothing unit 24, a processing unit 25 and a recording unit 26.

In step E1, the acquiring unit 23 is configured to acquire learning data relating to at least one aircraft and to a plurality of flights for each aircraft. The data are signals composed of time series of measurements or observations that originate from a first data source comprising the ACMS recordings of the set of aircraft. The data may also be collected from other data sources for example comprising manual requests, electronic logbooks and maintenance reports of the set of aircraft.

For each aircraft, the learning data may for example be ordered in the form of a matrix of n rows (representing n flights $f_1$-$f_n$) and m columns (representing m avionic parameters $P_1$-$P_m$). One coefficient $a_{ij}$ of the matrix represents one point or one time signal measured during the flight of the aircraft and relating to one parameter $P_j$ of one flight $f_i$ of the aircraft. It will be noted that the volume of data relating to the parameters monitored on board an aircraft is very large and may be about five million data for certain flights.

Thus, in step E2 in order to decrease the volume of data and the processing time, the smoothing unit 24 is advantageously configured to smooth the learning data, thus forming smoothed learning data. The smoothing may be carried out by filtering or by averaging or segmenting the data.

The segmentation consists of or comprises iteratively segmenting the time series of data into various segments until the desired number of segments or an error threshold is reached. Advantageously, the segmentation is carried out using a Haar wavelet technique that automatically determines the minimum number of segments allowing the dimensionality of the data to be optimally decreased while preserving the essential information contained in these data, as illustrated in FIGS. 3A and 3B.

Figure 3A:
FIGS. 3A and 3B illustrate a time series of data before and after smoothing, according to one embodiment of the disclosure herein.
Figure 3B:
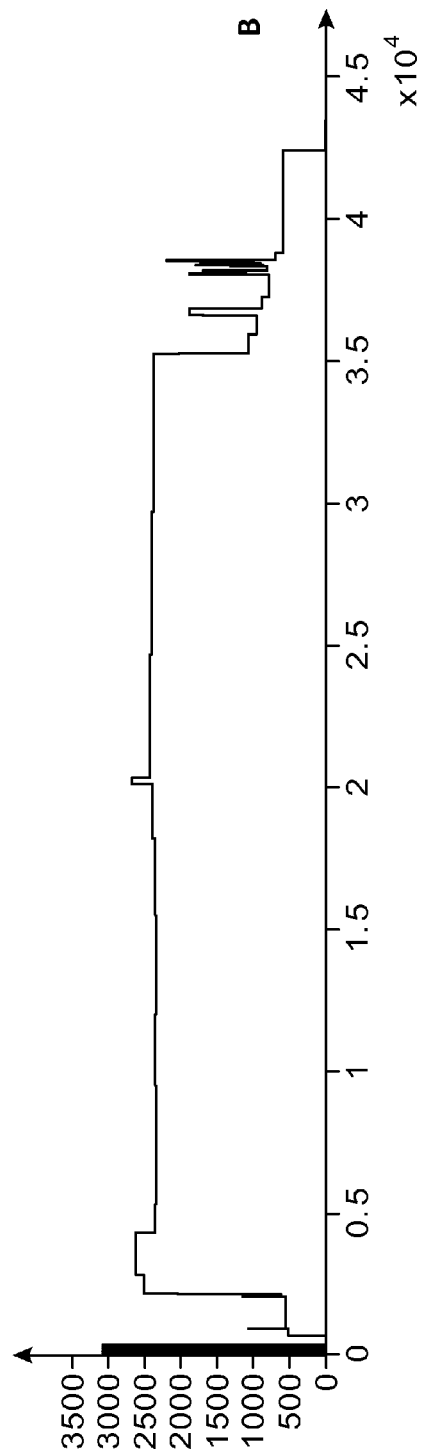

Specifically, FIG. 3A illustrates a time series of 45000 data before smoothing and FIG. 3B illustrates the conversion of the same time series into 27000 segments.

In step E3, the processing unit 25 is configured to automatically partition the smoothed learning data using an unsupervised learning technique generating a first class C1 of normal learning data and a second class C2 of abnormal learning data.

The partitioning is advantageously carried out using a technique directed by the data and based on a density measurement that does not require data groups to be constructed beforehand. Thus, the unsupervised learning method automatically discovers structures hidden in the data without any a priori knowledge in order to partition these data into homogeneous groups G1-G5 depending on their characteristics or behaviors.

The first class C1 of normal learning data corresponds to the reunion of all the homogeneous groups G1-G5 whereas the second class of abnormal learning data corresponds to the complement a1-a3 of these homogeneous groups. Thus, the second class C2 of abnormal learning data comprises the irregular data a1-a3 that do not correspond to the normal patterns suggested by the majority of observations.

The class C1 of normal learning data may be confirmed by experts and one and/or other of the two classes C1, C2 may be used to make statistical analyses, prognoses or other analyses.

In particular, one of the two data classes C1, C2 may be used on board the aircraft to detect anomalies using a semi-learning technique. However, it is more advantageous to use the abnormal data given that their volume is much smaller than that of the normal data.

Thus, in step E4, the recording unit 26 is configured to record the abnormal learning data in a knowledge database 33.

In step E5, the knowledge database 33 is transferred to or installed on board the aircraft and more specifically in the on-board analyzing device 1.

Specifically, the on-board analyzing device 1 comprises an on-board knowledge database 133, an acquiring module 3, an on-board buffer memory 4, an on-board smoothing module 34, an on-board processing module 5, an on-board alert-emitting module 7, and an on-board transmitting module 9.

The on-board knowledge database 133 corresponds to the knowledge database 33 and therefore comprises the abnormal learning data created by the ground-based analyzing device 21.

Thus, in step E11, when the aircraft is in flight, the on-board acquiring module 3 is configured to acquire, during the flight time, time series of data relating to the aircraft originating essentially from the ACMS.

In step E12, in order to process the data in small packets, the buffer memory 4 is configured to place therein a preset amount of the time series data acquired by the acquiring module 3. This makes it possible to facilitate the data segmentation.

In step E13, the smoothing module 34 is configured to collect the data buffered by the buffer memory 4 and to smooth these data for example using a segmentation technique before they are processed by the processing module 5.

In step E14, the processing module 5 is configured to collect the smoothing data and to partition these data into a set of homogeneous groups using a semi-supervised learning technique. Specifically, the processing module 5 consults the knowledge database 133 in order to compare the as yet unlabeled data collected on board the aircraft to abnormal learning data recorded in this database 133. Thus, any actual datum collected on board the aircraft that turns out to be located within a preset vicinity of an abnormal learning datum is itself labeled as abnormal. The processing module 5 thus allows all the abnormal data to be detected in real-time and for all the parameters.

Advantageously, the on-board processing module 5 may also be configured to partition the actual data using an unsupervised learning technique. In order to limit calculation time, this processing may be carried out on the various signals individually (i.e. one signal at a time). This unsupervised analysis allows jumps or condition changes in each of the processed signals to be detected.

In step E15, the alert-emitting module 7 is configured to emit an alert report on each detection of an anomaly on board the aircraft. It will be noted that the alert report comprises the data recorded about the anomaly detected using the semi-supervised learning technique. Optionally, the alert report may also contain data relating to the anomaly detected using the unsupervised learning technique.

In step E16, the transmitting module 9 is configured to compress and transmit the alert report to a ground station in real-time via the network 13 (AGARS).

Furthermore, the knowledge database 133 is advantageously periodically updated. Specifically, for example after about each ten flights, all the data recorded in the aircraft are collected on landing. These data are then analyzed in the ground-based analyzing device 21 using steps E1-E5 in order to enrich and update the on-board knowledge database 133.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A system for generating an alert report on board an aircraft, the system comprising:
   an on-board acquiring module configured to acquire data relating to the aircraft, the data originating from at least one of sensors and equipment installed in the aircraft;
   an on-board processing module configured to detect possible anomalies by automatically partitioning the data into a set of homogeneous groups, wherein the processing module is configured to automatically partition the data using a semi-supervised learning technique by comparing the data to abnormal learning data recorded in an on-board knowledge database;
   an acquiring unit configured to acquire learning data relating to at least one aircraft;
   a smoothing unit configured to smooth the learning data, thus forming smoothed learning data;
   a processing unit configured to automatically partition the smoothed learning data using an unsupervised learning technique generating a first class of normal learning data and a second class of abnormal learning data;
   a recording unit configured to record the abnormal learning data in a knowledge database corresponding to the on-board knowledge database;
   an on-board alert-emitting module configured to emit an alert report on each detection of an anomaly; and
   an on-board transmitting module configured to transmit the alert report to the ground and in real-time.

2. The system as claimed in claim 1, comprising:
   an on-board buffer memory configured to buffer the data acquired by the acquiring module; and
   an on-board smoothing module configured to smooth the buffered data before the data is processed by the processing module.

3. The system as claimed in claim 1, wherein the acquiring unit is configured to acquire the learning data from a first data source comprising ACMS recordings of a set of aircraft and of various flights or other data sources comprising manual requests, electronic logbooks and maintenance reports of the set of aircrafts.

4. An aircraft comprising a generating system as claimed in claim 1.

5. A method for generating an alert report on board an aircraft, comprising:
   acquiring data relating to the aircraft originating from at least one of sensors and equipment installed in the aircraft;
   detecting possible anomalies by automatically partitioning the data into a set of homogeneous groups, wherein the data is partitioned using a semi-supervised learning technique by comparing the data to abnormal learning data recorded in a knowledge database installed on board the aircraft, wherein the knowledge database is constructed on the ground by:
      acquiring learning data relating to at least one aircraft;
      smoothing the learning data, thus forming smoothed learning data;
      automatically partitioning the smoothed learning data using an unsupervised learning technique generating a first class of normal learning data and a second class of abnormal learning data;
      recording the abnormal learning data in the knowledge database; and
      installing the knowledge database on board the aircraft;
   emitting an alert report on each detection of an anomaly; and
   transmitting the alert report to the ground and in real-time.

6. The method as claimed in claim 5, comprising periodically updating the knowledge database.

* * * * *